April 6, 1971 M. A. KNIGHT 3,573,987
ELECTROCHEMICAL ELECTRIC POWER GENERATOR
Filed July 28, 1969
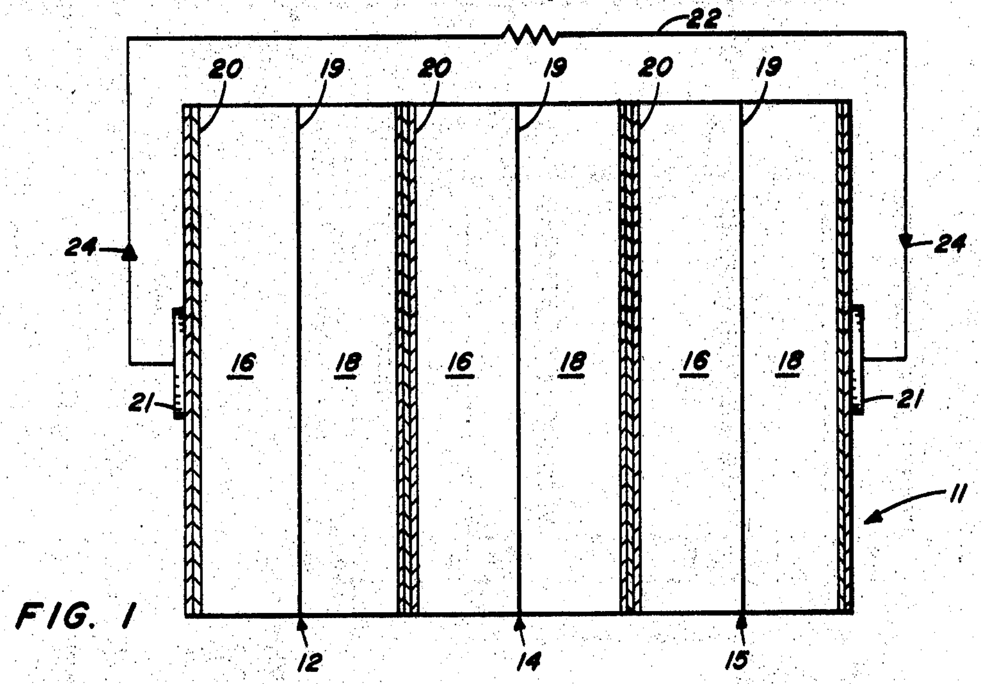
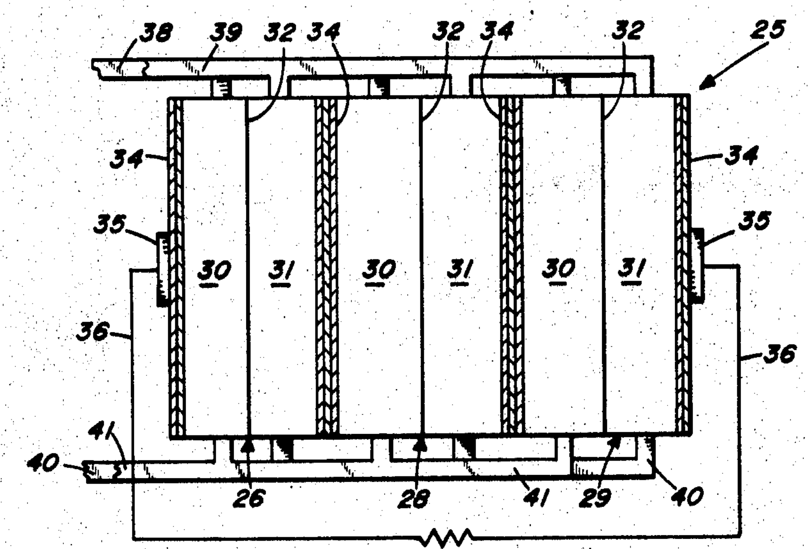
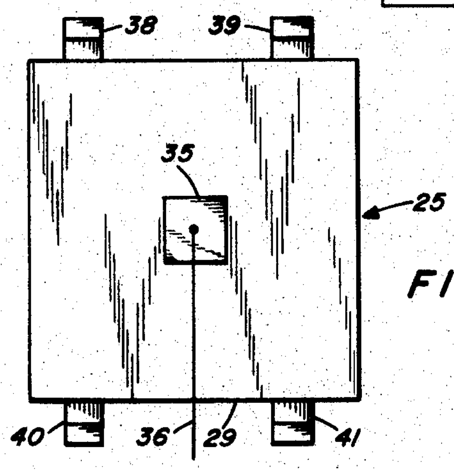
FIG. 3
INVENTOR
MILTON A. KNIGHT
BY Thomas O. Watson Jr.
ATTORNEY United States Patent Office 3,573,987

Patented Apr. 6, 1971

3,573,987

ELECTROCHEMICAL ELECTRIC POWER GENERATOR

Milton A. Knight, Centreville, Va.
(P.O. Box 1288, Kissimmee, Fla. 32741)

Filed July 28, 1969, Ser. No. 845,372
Int. Cl. H01m *21/00*
U.S. Cl. 136—83 12 Claims

ABSTRACT OF THE DISCLOSURE

An electrochemical power generator wherein each electrode is made of a liquid, the electrodes of each cell being separated by an ion exchange membrane, and the cells being separated by conducting current collectors.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Field of the invention

This invention relates to electrochemical power generators and, more particularly, to electrochemical power generators having liquid electrodes.

Description of the prior art

Normally, electrochemical power generators are made having a solid cathode and a solid anode, the cathode and anode being immersed in electrolytes and being connected by an external conductor. The electrochemical reaction takes place between the electrodes and the electrolyte at the surface of the electrodes. An electron must travel through the electrode, the external conductor, and the other electrode to reach the electrolyte in the adjacent cell. This involves substantial resistance losses.

Some batteries have been constructed which have bipolar electrodes where an electrode is the cathode of one cell and the anode of another cell. However, in these batteries an electrochemical reaction still takes place at the electrolyte electrode interface.

Applicant's invention eliminates the electrical resistance losses of solid electrode batteries and furthermore eliminates many other problems of solid electrode batteries. For example, there is a uniform electrochemical reaction within applicant's cell making the current density and potential the same throughout the cell. This prevents the creation of "hot spots" such as those created in solid electrode batteries. As a result of applicant's invention a battery is created which will provide a theoretical 2000 watt hours per pound of reactants, such as with the lithium-chlorine trifluoride system; whereas the best of the presently available batteries, such as the silver zinc solid electrode battery provides a theoretical 200 watt hours per pound of reactants.

SUMMARY OF THE INVENTION

Applicant provides liquid electrodes, one a fuel and one an oxidant. The electrodes in a single cell are separated by an ion exchange membrane which permits ions to transfer from one electrode to the other electrode. The separate cells are enclosed and separated by current collectors which are electrically conductive sheets chemically inert with the material of the electrodes. These current collectors allow passage of electrons from the anode of one cell to the cathode of the adjacent cell. Preferably, none of the solid components of applicant's power generator are involved in an electrochemical reaction. Rather the electrochemical reactions take place uniformly throughout the liquid electrodes.

OBJECTS OF THE INVENTION

An object of the present invention is the provision of an electrochemical power generator with minimum resistance losses.

Another object of this invention is to provide an electrochemical power generator having a uniform electrochemical reaction within the cells.

A further object is the provision of an electrochemical power generator having uniform current density and potential throughout the cell.

A still further object of the present invention is to provide an electrochemical power generator in which none of the solid components are involved in an electrochemical reaction.

Other objects, advantages and novel features of the invention will become apparent from the following detailed description of the invention when considered in conjunction with the accompanying drawings.

BRIEF DESCRIPTION OF THE DRAWINGS

FIG. 1 shows a three cell battery of applicant's invention;

FIG. 2 is a side view of a three cell fuel cell of applicant's invention; and

FIG. 3 is an end view of the fuel cell of FIG. 2.

DESCRIPTION OF THE PREFERRED EMBODIMENTS

FIG. 1 shows a battery of applicant's invention generally designated by reference numeral 11. The battery is made up of three cells 12, 14, and 15, each cell containing a liquid anode 16 and a liquid cathode 18. The anode and cathode of each cell are separated by an ion exchange member 19. Ion exchange members are well known in the art and the particular member used can be selected from those known. (For examples of known ion exchange members, see Pats. 3,234,116 to Holt et al., 3,239,382 to Thompson, and 3,281,275 to Levine et al.) The individual cells are enclosed and separated from one another by current collectors 20. The current collectors are made of electrically conductive material which preferably is chemically inert with the liquid electrodes so that no electrochemical reaction takes place at the interface between the collector and the liquid electrode. The current collectors serve only to conduct electrons between adjacent cells. Since the current collectors are preferably to be chemically inert with the liquid electrode, it is often desirable to make the current collector of two or three layers of metal. Therefore, the surface of the collector which faces the liquid anode of one cell would be made of a first material inert with the material of the anode. The surface of the electrode which faces the liquid cathode of the adjacent cell would be made of a second material which is chemically inert with the material of the cathode. In order to promote uniform electrical and thermal conduction through the current collector, it is advantageous to provide a copper (or other good electrical and thermal conductor) layer between the two surface layers of the current collector. Obviously, the current collectors which are at the ends of the battery need only be of one or two layers since they only come into contact with one electrode. The end current collectors are then connected by electrodes 21 and wire 22. Current will flow in wire 22 in the direction of arrows 24 from anode 16 of cell 12 to cathode 18 of cell 15.

FIGS. 2 and 3 show applicant's invention used as a fuel cell generally designated by reference numeral 25. The fuel cell is made up of three cells, 26, 28 and 29, each cell having an anode 30 and a cathode 31 which are separated from one another by an ion exchange member 32. The individual cells are enclosed and separated from one another by current collectors 34. The end current collectors are connected by electrodes 35 and wires 36. The only difference between this arrangement and a battery is that fresh electrode material is supplied to the cells and spent electrode material is removed from the cells providing for continuous, long-life operation of the fuel cell. The cathode material is provided through a conduit 38 and spent cathode material is removed through a conduit 41. Fresh anode material is provided through a conduit 39 and spent anode material is removed through a conduit 40.

The materials used to construct applicant's invention and the operation of the device is the same for a battery and for a fuel cell. Obviously many different chemicals can be used as the liquid electrodes. Preferably, an oxidant is used as one electrode and a fuel as the other electrode. A specific example of the materials which can be used is as follows: The anodes are lithium dissolved in $NH_3$ and the cathodes are $ClF_3$ dissolved in HF. The collector surfaces which face the anodes are made of material which is chemically inert with the anode material, such as titanium in this example. Similarly, the surface of the collector which faces the cathodes are made of material which is chemically inert with the cathode material, such as gold in this example. In operation the reaction begins in the anode where electrons are given up by the Li to form $Li^+$ ions. The electrons move to the current collector and pass therethrough assuming the outside circuit is closed. The electrons move into the cathode through the current collector and pass to the $ClF_3$ molecules to reduce them to $Cl^-$ and $F^-$ ions. These ions pass through the ion exchange member to the next anode and combine with the $Li^+$ ions which are there forming LiF and LiCl molecules. The actual balanced cell reaction is $4Li+ClF_3=3LiF+LiCl$. As the reaction takes place a current is created through external circuit 22. If the external circuit is open the electrons will build up on the anode side of the current collector until open circuit potential is reached. This, in a case of a three cell battery as shown in FIG. 1, is approximately 5.2 volts. The ion exchange member should be selective so that it will pass only ions and allow no diffusion of the anode or cathode material. This is particularly true when the anode and cathode materials will violently react when combined.

Another combination of anode and cathode materials is $TeCl_2$ for the anode and $CuCl_2$ for the cathode. With these materials the $TeCl_2$ molecules in the anode give up electrons to the current collector resulting in $TeCl_2^+$ ions which remain in the anode. The electrons travel to the adjacent cathode through the current collector and become attached to $CuCl_2$ molecules thereby forming $Cl^-$ ions which penetrate the ion exchange member and combine with $TeCl_2^+$ ions in the anode forming neutral $TeCl_4$ molecules. This is a normal oxidation reduction reaction. The reaction product at the cathode electrode is $CuCl_2$, and $TeCl_4$ at the anode electrode. Another embodiment contemplates the use of silver dissolved in KOH for one electrode and amalagamated zinc dissolved in KOH for the other electrode.

Obviously many modifications are possible in view of the above teachings. For example, it is not necessary that the current collectors be made of three or even two layers. A single metal sheet would do; however, it is preferable that the metal be chemically inert with the anode and cathode material, and the center sheet of copper enhances the uniformity of thermal and electrical conductivity through the collectors. Also, there are many other anode and cathode materials which can be used. When different anode and cathode materials are used a selection of chemically inert current collector material should be made and also a selection of an ion exchange member which will pass the proper ions and prevent diffusion of the electrode material should be made. The preferred embodiments have been shown having three cells. Obviously more or fewer cells can be used as required.

What is claimed is:

1. A multiple cell power generator which comprises:
   a plurality of cells adjacent to each other, each cell comprising a liquid anode and a liquid cathode;
   an ion exchange member within each of said cells separating said anode and cathode; and
   internal and external electrical conducting members enclosing each of said cells and separating one from the other, said internal conducting members being in physical contact with the liquid anode of one cell and the liquid cathode of the adjacent cell.

2. The multiple cell power generator of claim 1 wherein the conducting member is electro-chemically inert with the anode and cathode material.

3. A multiple cell power generator of claim 1 wherein the conducting member comprises two layers, one layer being of a material which is electro-chemically inert with the anode material and the other layer being of a material which is electro-chemically inert with the cathode material, each layer being in physical contact with the cell material with which it is electro-chemically inert.

4. The multiple cell power generator of claim 3 wherein the two conducting member layers are separated by and in physical contact with a material which is a good electrical and thermal conductor.

5. The multiple cell power generator of claim 4 wherein the separating third layer is made of copper.

6. The multiple cell power generator of claim 1 further comprising inlets and outlets for the separate addition and removal of anode and cathode material.

7. The multiple cell power generator of claim 1 wherein said liquid anode is lithium dissolved in $NH_3$ and said liquid cathode is $ClF_3$ dissolved in HF.

8. The multiple cell power generator of claim 3 wherein said liquid anode is lithium disolved in $NH_3$ and said liquid cathode is $ClF_3$ dissolved in HF.

9. The multiple cell power generator of claim 8 wherein said one layer of said conducting member is titanium and said other layer of said conducting member is gold.

10. The multiple cell power generator of claim 1 wherein said liquid anode is $TeCl_2$ and the liquid cathode is $CuCl_2$.

11. The multiple cell power generator of claim 1 where one of the liquid anode and cathode is silver dissolved in KOH and the other is zinc dissolved in KOH.

12. A multiple cell power generator of claim 1 wherein one of said liquid anode and said liquid cathode is a fuel and the other an oxidant.

References Cited

UNITED STATES PATENTS

| | | | |
|---|---|---|---|
| 2,081,926 | 6/1937 | Gyuris | 136—83.1 |
| 2,913,511 | 11/1959 | Grubb, Jr. | 136—120FC |
| 2,921,110 | 1/1960 | Crowley et al. | 136—86A |
| 3,152,015 | 10/1964 | Tirrell | 136—86E |
| 3,208,882 | 9/1965 | Markowitz | 136—86A |
| 3,234,050 | 2/1966 | Beltzer et al. | 136—86D |
| 3,245,836 | 4/1966 | Aqruss | 136—86A |
| 3,294,587 | 12/1966 | LeDuc | 136—86A |
| 3,368,922 | 2/1968 | Salyer | 136—86 |
| 3,408,229 | 10/1968 | Posey, Jr. et al. | 136—6 |
| 3,479,223 | 11/1969 | Duddy et al. | 136—6 |

WINSTON A. DOUGLAS, Primary Examiner

C. F. LEFEVOUR, Assistant Examiner

U.S. Cl. X.R.

136—6, 86